R. R. GUENTHER, Jr.
SIGNALING DEVICE.
APPLICATION FILED JULY 13, 1909.
949,703.
Patented Feb. 15, 1910.
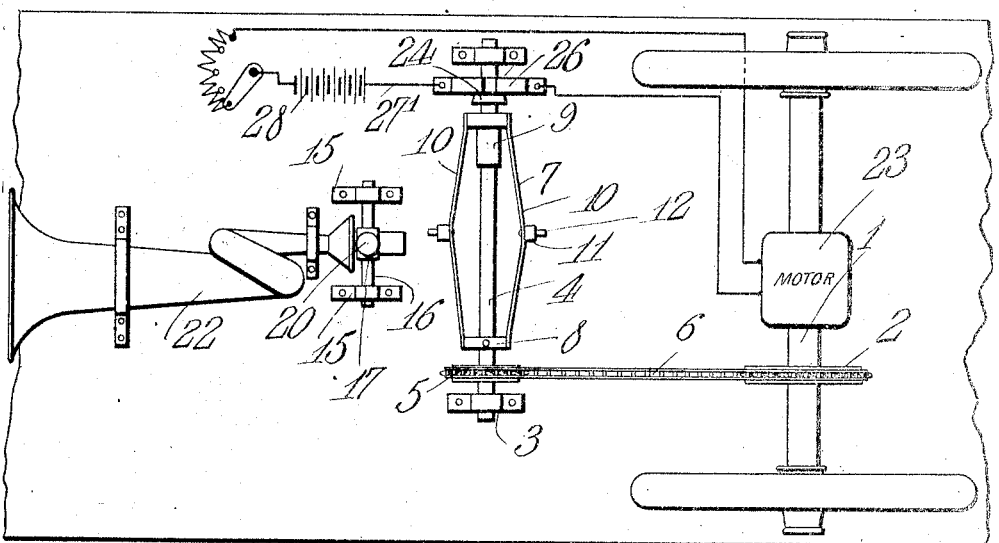
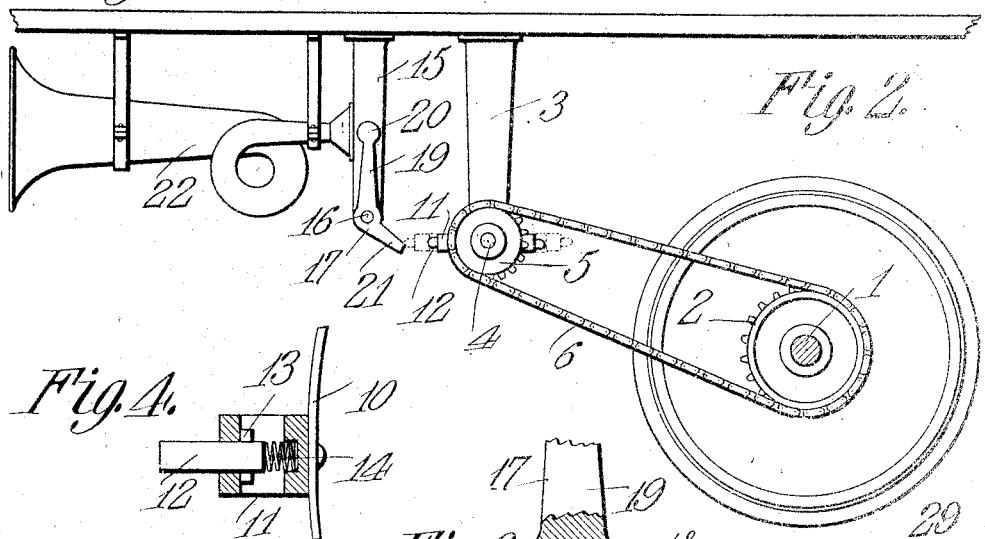
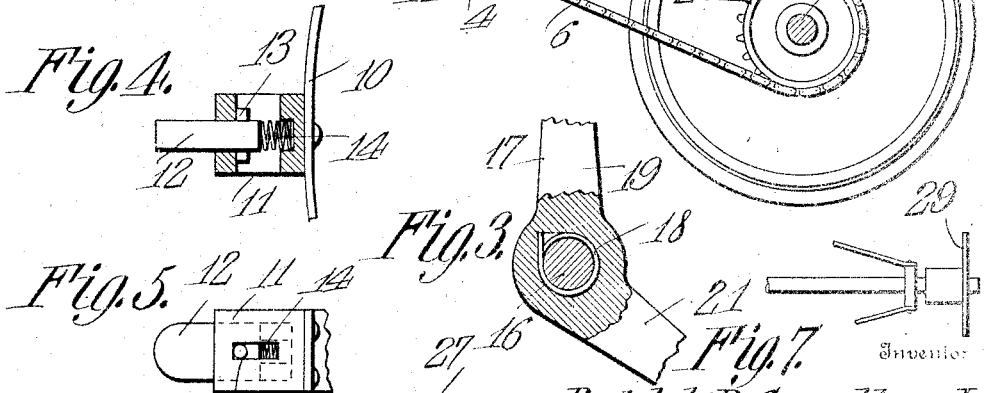
Inventor
Rudolph R. Guenther, Jr.

UNITED STATES PATENT OFFICE.

RUDOLPH R. GUENTHER, JR., OF SOUTH BETHLEHEM, PENNSYLVANIA.

SIGNALING DEVICE.

949,703.   Specification of Letters Patent.   Patented Feb. 15, 1910.

Application filed July 13, 1909. Serial No. 507,361.

*To all whom it may concern:*

Be it known that I, RUDOLPH R. GUENTHER, Jr., a citizen of the United States, residing at South Bethlehem, in the county of Northampton and State of Pennsylvania, have invented a new and useful Signaling Device, of which the following is a specification.

The object of this invention is to provide a simple and efficient device more particularly for use on motor vehicles by which, should the speed of the vehicle exceed a predetermined limit, an alarm will be sounded so that the operator of the vehicle will be informed of the conditions and shift the operating device so as to reduce the speed.

A further object of the invention is to provide a device for the purpose stated which will be composed of few parts and which will occupy very little room on the vehicle and will be out of the way of the driving mechanism or of the occupants of the vehicle.

These objects and such other objects as will hereinafter incidentally appear are attained by the use of the apparatus illustrated in the accompanying drawings, and the invention consists in certain novel features thereof, as will be hereinafter first fully described and then particularly pointed out in the appended claims.

In the drawings referred to, Figure 1 is a bottom plan view of so much of an automobile as is necessary to illustrate my invention. Fig. 2 is an elevation of the same. Fig. 3 is a detail view of a part of the vibratory beater. Figs. 4 and 5 are detail views of the tappet for actuating the said beater. Fig. 6 is a detail view of a part of the automatic stopping mechanism. Fig. 7 is a detail view of a modification of the automatic stopping mechanism.

The motor vehicle may be of any preferred type and forms no part of my invention, it being understood that my improved signal may be applied to any vehicle which is apt to be driven at a high speed, and may also be applied to some forms of machinery in which a dangerous speed is sometimes attained.

In applying my invention to any automobile the driving axle 1 is provided with a sprocket wheel 2 by which the motion given the axle from the driving wheels will be imparted to the signal through the mechanism to be described. Mounted in suitable brackets 3 on the under-side of the vehicle is a counter shaft 4, on one end of which is fixed a sprocket pinion 5, connected to the sprocket wheel 2 by a chain 6, as clearly shown. Upon the counter shaft 4 I mount a governor 7 which is of the centrifugal type, and has a fixed collar 8 secured to the shaft at one end, a slidable collar or sleeve 9 mounted on the shaft at the other end, and spring arms 10 secured to and connecting the said collar and slidable sleeve. At the centers of the said spring arms 10 I provide the weights 11 which will be thrown outwardly by centrifugal force when a high speed is imparted to the shaft, as will be readily understood, and these weights 11 are in the form of boxes having tappets 12 seated in and projecting through the same, the said tappets carrying pins 13 playing within the boxes and adapted to impinge against the front of the boxes so as to prevent the pins flying from the same. Springs 14 are seated in the boxes and bear against the tappets so as to hold them normally against the front walls of the boxes, as will be readily understood on reference to Figs. 4 and 5. Depending from the body of the vehicle adjacent to the brackets 3 are a pair of brackets 15 in the lower ends of which a rod 16 is secured. At the center of the said rod 16 a vibratory beater 17 is mounted, and the said beater is connected with the rod 16 by means of a spring 18 coiled around the rod within the beater and having its opposite ends secured to the rod and the beater respectively. This beater, as clearly shown in Fig. 2, has an upstanding arm 19 carrying a head 20 at its upper end and a lower arm 21 which extends toward the governor and is arranged in such position that it will project into the path of the tappets when the governor is expanded under a high rate of speed, as will be understood. Adjacent the beater, and with its front end in the path of movement of the head 20 of the beater is a horn 22 having a diaphragm stretched over its smaller end so that when the beater is vibrated, the head of the same will play upon said diaphragm, and consequently produce a loud drumming sound.

The operation of the device will, it is thought, be readily understood. When the vehicle is moving at a low rate of speed, the parts will assume the positions shown in Fig. 1 and in full lines in Fig. 2. Should the speed of the vehicle increase to an unsafe extent or beyond a limit which may be predetermined by giving the proper resisting strength to the spring arms of the governor, the centrifugal action of the governor will throw the weights 11 outward so that the tappets will assume the position shown in dotted lines in Fig. 2, and consequently as the governor continues to revolve will strike upon the end of the arm 21 of the beater and depress the same to the position shown in dotted lines in Fig. 2, from which position the beater will be returned by the action of the spring 18 immediately after the tappet has cleared the end of the beater arm 21. This return movement of the beater will throw the head 20 against the diaphragm on the end of the horn and will thereby sound the alarm. The liability of the parts to bind is effectually overcome by the provision of the springs 14 and 18, the spring 18 serving to yieldingly hold the beater upon the rod 16 and the springs 14 permitting the tappets to readily yield to the impact upon the beater arm so that they may recede as they are moved past the beater by the governor.

The device is very simple and may be applied to any vehicle and while the construction illustrated is the preferred embodiment of the invention, I do not limit myself to the exact details shown. For instance, the tappets may be arranged to ride upon the inner surface of a ring supported by the vehicle and connected with one pole of an electric battery, the other pole of the battery being connected to the spring arms of the governor. When the tappets are thrown out against the ring, a circuit will be closed through the battery and, as a result, coils will be energized so as to impart the desired vibratory movement to the beater.

In Fig. 1 I have shown an automatic stopping mechanism which may be employed in connection with the alarm, the vehicle being driven by an electric motor 23, mounted on the axle 1 in this instance. This stopping mechanism comprises a plug, 24, secured to the slidable sleeve 9 and insulated from said sleeve and the governor shaft. When the vehicle is proceeding at a slow speed, the plug 24 will fit between and in contact with brushes or terminals, 25, carried by poles or arms, 26, which are secured upon the bottom of the vehicle body and separated by a wooden block or other insulating material, 27. With the plug in contact with the brushes, a circuit will be closed over the conductors, 27', leading from the poles 26, through the motor and a battery 28, so that the motor will operate. When excessive speed causes the sleeve 9 to slide and sound the alarm as before described, the plug will be withdrawn from between the brushes and the circuit thereby broken whereupon the motor will lose its speed as will be understood. When the speed is brought within the desired limit, the plug, of course, resumes its position between the brushes and again closes the circuit.

When the device is applied to a vehicle driven by a fluid pressure or explosive engine, a disk 29 is secured to the end of the plug and arranged to be drawn against a valve (not shown) when the speed is excessive. The said valve will be arranged to permit escape of the steam or other driving agent in a fluid pressure engine or to cut off the supply of fuel to an explosive engine until the speed has been reduced.

Having thus described my invention, what I claim is:—

1. A high speed alarm comprising a sounding device, a vibratory arm adapted to play upon said sounding device, a governor arranged adjacent to the vibratory arm, and means for operating the governor.

2. The combination of a sounding device having a diaphragm, a beater arranged to play upon said diaphragm, and a governor carrying tappets adapted to actuate said beater.

3. The combination of a sounding device, a vibratory beater arranged to play upon said sounding device, a centrifugal governor, and yieldable tappets carried by said governor and adapted to impinge upon said vibratory beater.

4. The combination of a sounding device, a beater arranged to play upon the same, a centrifugal governor, and tappets carried by said governor and comprising boxes secured to the governor, tappet arms mounted in and projecting from the boxes, pins in said arms adapted to bear against the front walls of the boxes, and springs seated between the rear walls of the boxes and the said arms.

5. The combination with a sounding device, of a vibratory beater arranged to play upon the same, a governor, tappets carried by said governor and arranged to engage the said beater and move the same from the sounding device, and yieldable means for holding the said beater against the sounding device.

In testimony that I claim the foregoing as my own, I have hereto affixed my signature in the presence of two witnesses.

RUDOLPH R. GUENTHER, Jr.

Witnesses:
 MAX THIEL,
 RUDOLF HESKE.